(12) United States Patent
Natarajan et al.

(10) Patent No.: US 9,112,392 B2
(45) Date of Patent: Aug. 18, 2015

(54) DYNAMOELECTRIC MACHINE SUPPORT SYSTEM

(75) Inventors: Subbiah Natarajan, Hyderabad (IN); Karthik Govindaraj, Hyderabad (IN)

(73) Assignee: General Electric Company, Schenectady, NY (US)

( * ) Notice: Subject to any disclaimer, the term of this patent is extended or adjusted under 35 U.S.C. 154(b) by 590 days.

(21) Appl. No.: 13/544,291

(22) Filed: Jul. 9, 2012

(65) Prior Publication Data

US 2014/0009010 A1   Jan. 9, 2014

(51) Int. Cl.
   *H02K 5/24*   (2006.01)

(52) U.S. Cl.
   CPC .............. *H02K 5/24* (2013.01); *H02K 2213/09* (2013.01)

(58) Field of Classification Search
   None
   See application file for complete search history.

(56) References Cited

U.S. PATENT DOCUMENTS

| | | | |
|---|---|---|---|
| 3,486,585 A | | 12/1969 | Richter et al. |
| 3,858,067 A | * | 12/1974 | Otto ...................... 310/216.132 |
| 3,988,622 A | * | 10/1976 | Starcevic ........................ 310/91 |
| 4,450,373 A | * | 5/1984 | Miller et al. .................... 310/51 |
| 4,587,722 A | * | 5/1986 | Miller ............................. 29/596 |
| 5,205,190 A | | 4/1993 | Kohring |
| 5,783,892 A | * | 7/1998 | Kanzaki et al. ............... 310/432 |
| 2007/0256428 A1 | | 11/2007 | Unger et al. |
| 2011/0121680 A1 | * | 5/2011 | Boardman et al. ..... 310/216.129 |
| 2011/0210643 A1 | * | 9/2011 | Tanavde et al. ........ 310/216.113 |

* cited by examiner

*Primary Examiner* — Tran Nguyen
(74) *Attorney, Agent, or Firm* — Ernest G. Cusick; Hoffman Warnick LLC (57) ABSTRACT

Various embodiments of the disclosure include a dynamoelectric machine support system. In some embodiments, a support system for a dynamoelectric machine is disclosed, the support system having: a housing; a skeletal frame attached to the housing and at least partially contained within the housing; and at least one adjustment mechanism for applying a force to the skeletal frame to modify a stiffness of the skeletal frame.

17 Claims, 7 Drawing Sheets

DYNAMOELECTRIC MACHINE SUPPORT SYSTEM

FIELD OF THE INVENTION

The subject matter disclosed herein relates to dynamoelectric machines. More particularly, aspects of the disclosure relate to support systems for a dynamoelectric machine.

BACKGROUND OF THE INVENTION

Dynamoelectric machines, such as electric motors, can be configured to operate at distinct frequencies, where those distinct frequencies, e.g., 50 Hertz (Hz) and 60 Hz, correspond to distinct desired performance characteristics. However, the frame housing the dynamoelectric machine is traditionally fixed, e.g., to a surface such as a floor, using a mounting plate and foot box or other similar base. This system includes dynamoelectric machine assembled in the housing. This system is tuned for a particular frequency range. When the dynamoelectric machine operates at a frequency which matches the natural frequency of the system, resonance may degrade its performance.

BRIEF DESCRIPTION OF THE INVENTION

Various embodiments of the disclosure include a dynamoelectric machine support system. In some embodiments, a support system for a dynamoelectric machine is disclosed, the support system including: a housing; a skeletal frame attached to the housing and at least partially contained within the housing; and at least one adjustment mechanism for applying a force to the skeletal frame to modify stiffness of the skeletal frame.

A first aspect of the invention includes a support system for a dynamoelectric machine, the support system including: a housing; a skeletal frame attached to the housing and at least partially contained within the housing; and at least one adjustment mechanism for applying a force to the skeletal frame to modify stiffness of the skeletal frame.

A second aspect of the invention includes a system having: a dynamoelectric machine; a support system supporting the dynamoelectric machine, the support system including: a housing; a skeletal frame attached to the housing and at least partially contained within the housing; and at least one adjustment mechanism for applying a force to the skeletal frame to modify a stiffness of the skeletal frame.

A third aspect of the invention includes a support system for a dynamoelectric machine, the support system including: a housing; a skeletal frame attached to the housing and at least partially contained within the housing; an adjustment mechanism at least partially housed within an axially facing surface of the housing, the adjustment system for applying a force to the skeletal frame to modify a stiffness of the skeletal frame.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted herein, the subject matter disclosed relates to dynamoelectric machines. More particularly, aspects of the disclosure relate to an adjustable support system for a dynamoelectric machine.

Dynamoelectric machines, such as electric motors, can be configured to operate at distinct frequencies, where those distinct frequencies correspond to distinct desired performance characteristics. However, the frame housing the dynamoelectric machine is traditionally fixed, e.g., to a surface such as a floor, using a foot box and mounting plates or other similar base. When the dynamoelectric machine operates at a frequency same as the natural frequency of system, resonance may degrade the performance of the dynamoelectric machine and the housing.

Various embodiments of the invention help to remedy the above-noted shortcomings in the conventional dynamoelectric machine frames (including "foot boxes") by employing at least one adjustment mechanism for modifying the stiffness of the skeletal frame.

In various particular embodiments, a support system for a dynamoelectric machine is disclosed. The support system can include: a housing; a skeletal frame attached to the housing and at least partially contained within the housing; and at least one adjustment mechanism for applying a force to the skeletal frame to modify a stiffness of the skeletal frame. In modifying the stiffness of the frame, the adjustment mechanism modifies a natural frequency of the system that includes housing and dynamoelectric machine.

Figure 1:
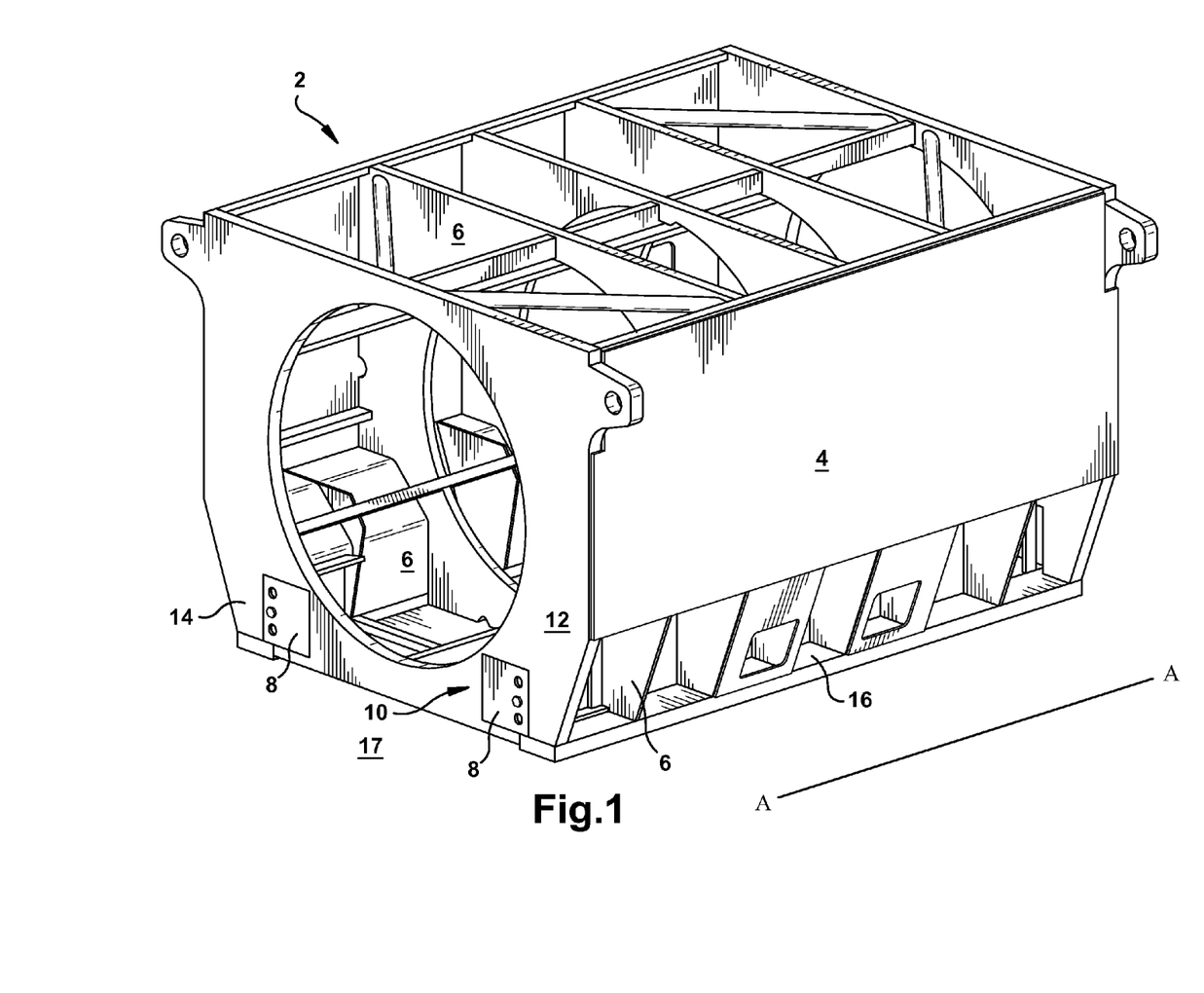
FIG. 1 shows a three-dimensional perspective view of a support system according to various embodiments of the invention.

Turning to FIG. 1, a three-dimensional perspective view of a support system 2 for a dynamoelectric machine (not depicted) is shown according to various embodiments of the invention. As shown, the support system 2 can include a housing 4, and a skeletal frame 6 attached to the housing 4. The skeletal frame 6 is at least partially contained within the housing 4. Additionally, the system 2 can include at least one adjustment mechanism 8 for modifying the stiffness of skeletal frame 6. Additional details of the support system 2 are shown and described with respect to the additional Figures herein.

As shown in FIG. 1, the housing 4 can include a slot 10 which is sized to complement the at least one adjustment mechanism 8. In this case, the slot 10 is located in an axially facing wall 12 of the housing 4, which faces a direction parallel with the primary axis (A) of the support system 2. It is understood that this primary axis (A) is parallel with the axis of rotation of the dynamoelectric machine which will ultimately be supported by the support system 2.

Figure 2:
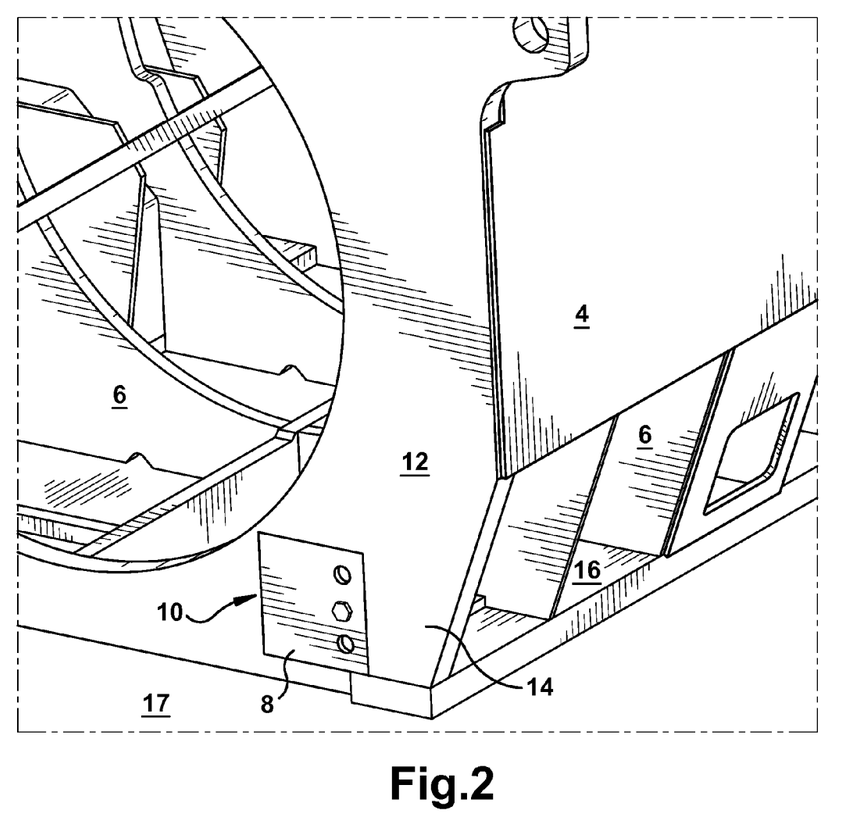
FIG. 2 shows a close-up perspective view of the support system of FIG. 1 according to various embodiments of the invention.

FIG. 2 shows a close-up view of the three-dimensional perspective of FIG. 1, further illustrating the interaction between the housing 4 (including slot 10) and the adjustment mechanism 8. In some embodiments, the adjustment mechanism 8 can fit flush within the slot 10 such that only a small, nominal portion of the adjustment mechanism 8 protrudes axially from the housing 4. As described further herein, the adjustment mechanism 8 allows for applying a force on the skeletal frame 6 to modify a stiffness of the skeletal frame 6, which in turn modifies a natural frequency of the system that includes dynamoelectric machine (FIG. 8, item 42, shown and described further herein) assembled to the housing 4. In some cases, the adjustment mechanism 8 can be actuated by a human operator, and in other cases, the adjustment mechanism 8 may be actuated automatically, e.g., via an electro-mechanical control system.

As additionally described herein, the adjustment mechanism 8 allows for adjustment of the stiffness of the skeletal frame 6 within the housing 4 from a location external to the housing 4. That is, as will be described herein, an operator may adjust the stiffness of the skeletal frame 6 (and the natural frequency of the system that includes dynamoelectric machine 42 (FIG. 8)) assembled to the housing 4, from outside of the housing 4, including, in some embodiments, while a dynamoelectric machine (not shown) is operating within the support system 2.

In some embodiments, as shown in FIGS. 1-2, the adjustment mechanism 8 is located proximate (near or nearly contacting) a corner 14 of the housing 4. That is, the adjustment mechanism 8 can apply a force to the skeletal frame 6, e.g., proximate a corner 14 of the housing 4. In some cases, the corner 14 contacts a "foot" 16 of the system 2, where the foot 16 is designed to rest on a surface such as a floor or operating platform (not shown). In some embodiments, a plurality of adjustment mechanisms 8 are implemented in conjunction with the housing 4 and the skeletal frame 6. In some particular cases, these adjustment mechanisms 8 (e.g., up to 4) are each located near a bottom (proximate to foot 16) corner 14 of the housing 4. It is understood that in various other embodiments, any number of adjustment mechanisms 8 can be utilized proximate any portion of the housing 4, and may be located anywhere within the wall 12 of the housing 4.

Figure 3:
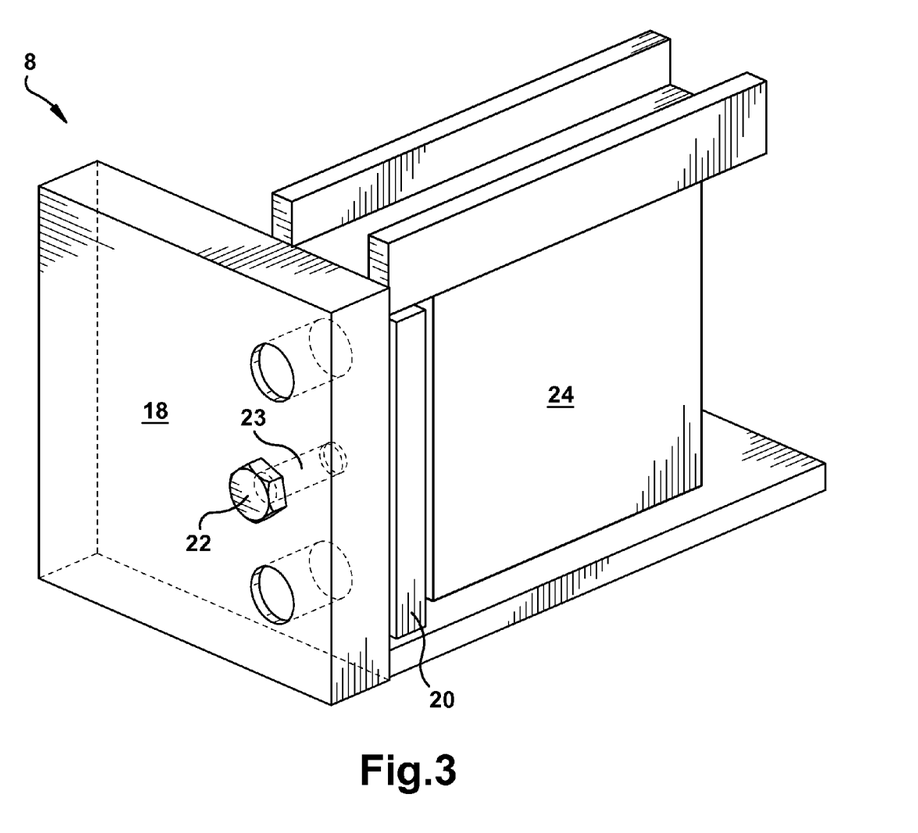
FIG. 3 shows a three-dimensional perspective view of an adjustment mechanism according to various embodiments of the invention.
Figure 4:
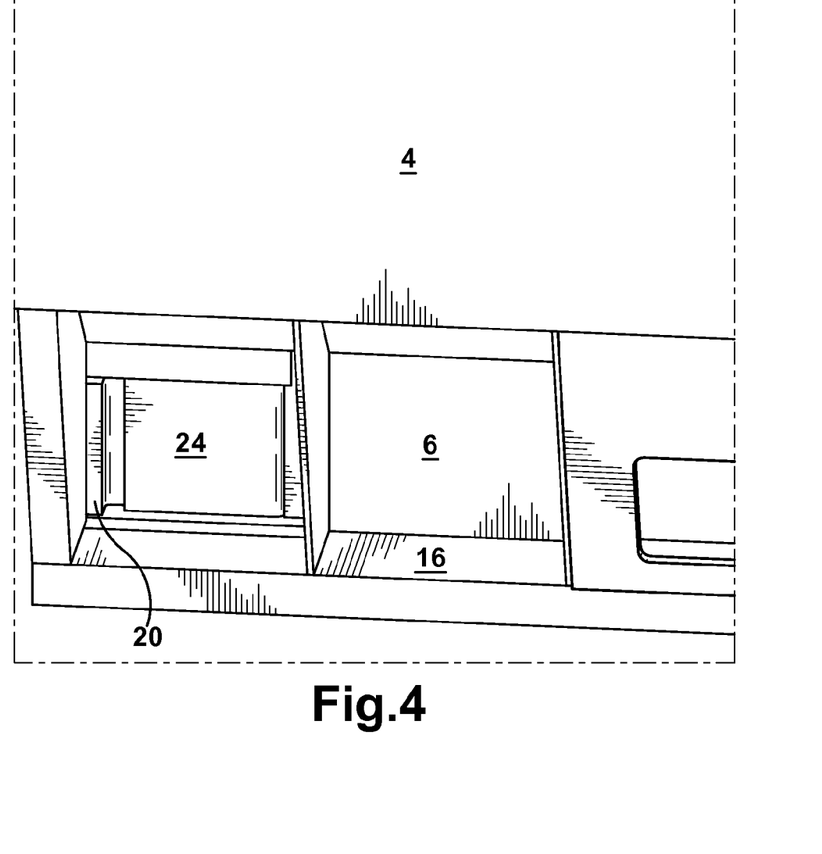
FIG. 4 shows a side perspective view of a portion of the support system of FIG. 1 and adjustment mechanism of the FIG. 3 assembled together according to various embodiments of the invention.
Figure 5:
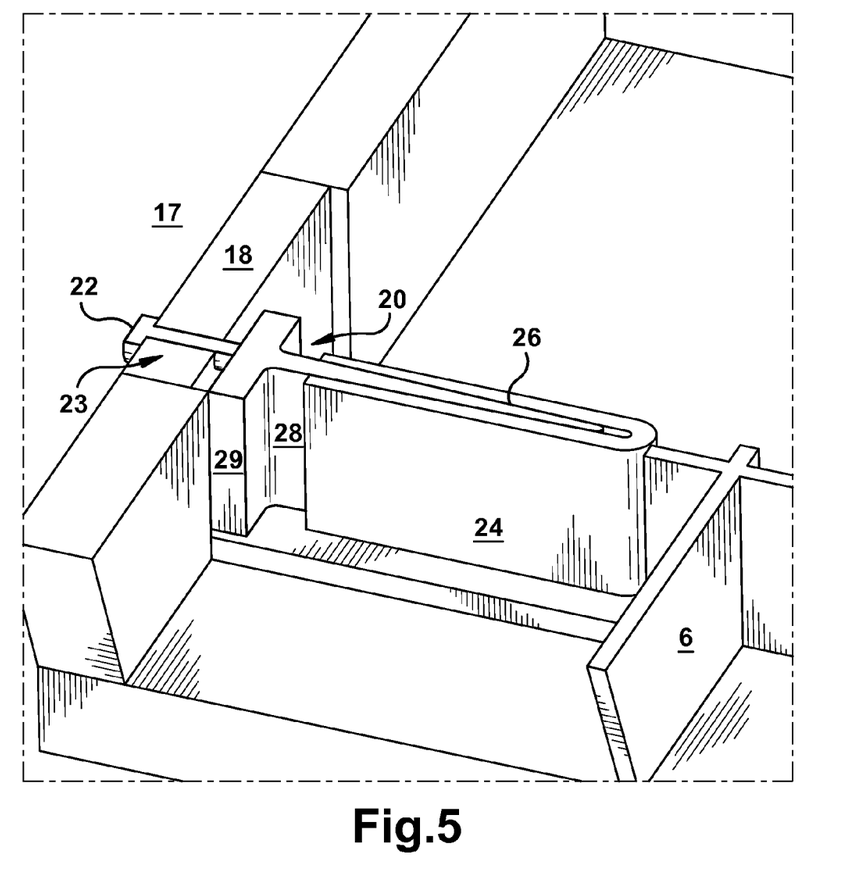
FIG. 5 shows a cut-away perspective view of a portion of the support system of FIG. 1 and adjustment mechanism of the FIG. 3 assembled together according to various embodiments of the invention.

FIG. 3 shows a close-up perspective view of an adjustment mechanism 8 according to various embodiments of the invention. In this embodiment, the adjustment mechanism 8 includes a mechanical adjustment system, which includes a face plate 18, a male member 20 adjacent the face plate 18, and one or more actuation members 22 such as a bolt, a pin, a screw, a coupling plate, etc. The actuation member(s) 22 can actuate movement of the male member 20 to contact a female member 24, which is always in contact with the skeletal frame 6 (as seen in the side perspective view of FIG. 4). After movement, the male member 20 contacts the female member 24, after which they together act as one integral unit, which in turn modifies the stiffness of skeletal frame 6. In some cases, the actuation member 22 includes a screw, which is sized to fit within a threaded opening 23 (shown in phantom in FIG. 3). The actuation member 22 (e.g., screw) can be actuated (e.g., turned) from a location 17 external to the housing 4 in order to push the male member 20 into the female member 24, which in turn generates force between the contacting members that makes them behave as an integral unit and this increases the stiffness of the skeletal frame 6 (inside the housing 4). This can be more clearly seen in the cut-away perspective view of FIG. 5, which shows a wedge-shaped male member 20 (according to various embodiments) and a female member 24 having a tapered slot 26 (according to various embodiments). In this case, movement of the actuation member 22 (e.g., via turning of a screw or depressing of a locking pin, etc.) applies an axial force on the male member 20, which in turn translates that axial force to the female member 24. It is understood that in this embodiment, the wedge-shaped portion 28 of the male member 20 can move within the slot 26 before translating the majority of the axial force to the female member 24. That is, the wedge-shaped portion 28 may not translate a majority of the axially directed force to the female member 24 (and consequently, the skeletal frame 6) until the wedge-shaped portion 28 completely fills the space within the slot 26, at which point, the female member 24 may flex to absorb the force of the female member 24. It is understood that the female member 24 is substantially fixed to the frame 6, such that the male member 20 (in particular, the wedge-shaped portion 28) may cause the female member 24 to flex when the male member 20 is displaced by the actuating member 22. As the female member 24 absorbs the applied force of the male member 20, the stiffness of the frame 6 is modified, e.g., it becomes stiffer as the male member 20 applies greater force to the female member 24. It is understood that as the male member 20 applies lesser force to the female member 24, the stiffness of the frame 6 can be reduced.

In various embodiments, the actuating member 22 includes a pneumatic actuating member, and in this case, the adjustment mechanism 8 can include a pneumatic adjustment mechanism. In various other embodiments, the adjustment mechanism 8 can include an electro-mechanical adjustment mechanism which can include one ore more electrically (automatically) or manually actuatable members (e.g., actuation member 22). As described herein, in some cases, the adjustment mechanism 8 can be actuated automatically (e.g., by a control mechanism in response to a stimulus), or manually (e.g., by a human user).

It is understood that in embodiments where the adjustment mechanism 8 includes a mechanical adjustment system, the male member 20 may remain substantially unaffixed to the female member 24 and the face plate 18. In some cases, the male member 20 is affixed to the actuation member 22, but in other cases, the male member 20 is simply placed between to the face plate 18 and the female member 24, and the actuation member 22 is sized to contact the male member 24, e.g., at a base portion 29. In some cases, where the male member 20 is simply placed between the face plate 18 and the female member 24, a spring is suitably placed between movable male member 20 and female member 29 to facilitate retraction of the wedge portion 28 of the male member 20 from the tapered slot 26 of the female member 24.

Figure 6:
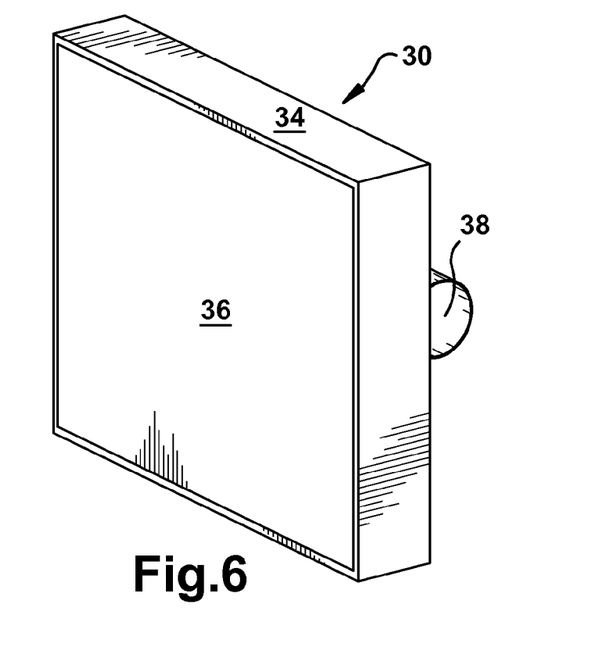
FIGS. 6-7 shows perspective views of alternative adjustment mechanisms according to various embodiments of the invention.
Figure 7:
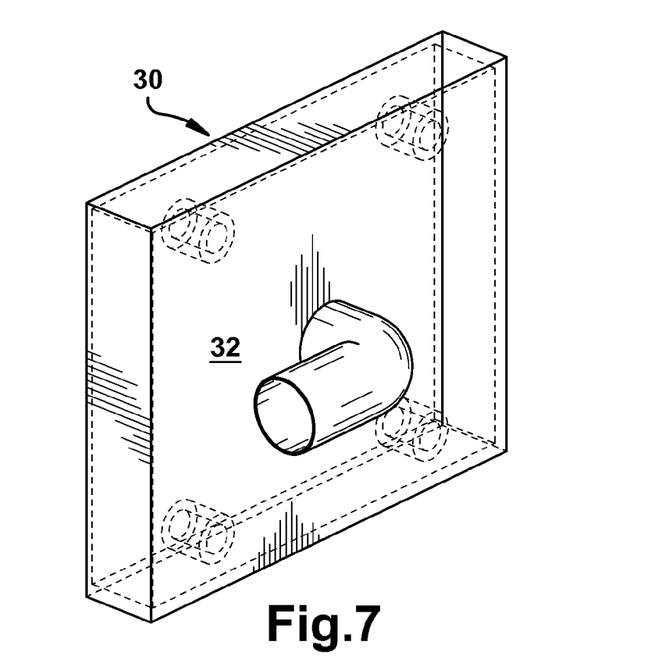

FIGS. 6 and 7 show perspective views of an alternative adjustment mechanism 8 which includes a hydraulic adjustment system 30. The hydraulic adjustment system 30 can include a face plate 32, a hydraulic chamber 34 with hydraulic force plate 36, and a hydraulic conduit 38 fluidly connected with the hydraulic chamber 34 and the hydraulic force plate 36. In this embodiment, the hydraulic force plate 36 is configured to provide an axial force on the female member 24 in such a manner that the hydraulic force plate 36 and the female member 24 act as an integral unit, which in turn increases the stiffness of skeletal frame 6. The hydraulic conduit 38 can be connected to any conventional hydraulic pump (not shown) for providing hydraulic fluid to the hydraulic chamber 34, which then imparts the force form that fluid to the hydraulic face plate 32. As described herein, the hydraulic face plate 32 may be configured to contact female member 24 and increase stiffness of skeletal frame 6, via the flow of hydraulic fluid.

As shown and described herein, the face plates 18, 32 can fit substantially flush against the outer surface of the housing 4. In other embodiments, however, the face plates 18, 32 may protrude from the outer surface of the housing 4.

It is understood that as shown and described herein, any number and/or type of adjustment mechanisms (e.g., adjustment mechanism 8) may be employed according to various embodiments of the invention. That is, one or more (e.g., 2, 4, 6, 8, etc.) adjustment mechanisms may be employed to modify the stiffness of a skeletal frame according to various embodiments of the invention.

Figure 8:
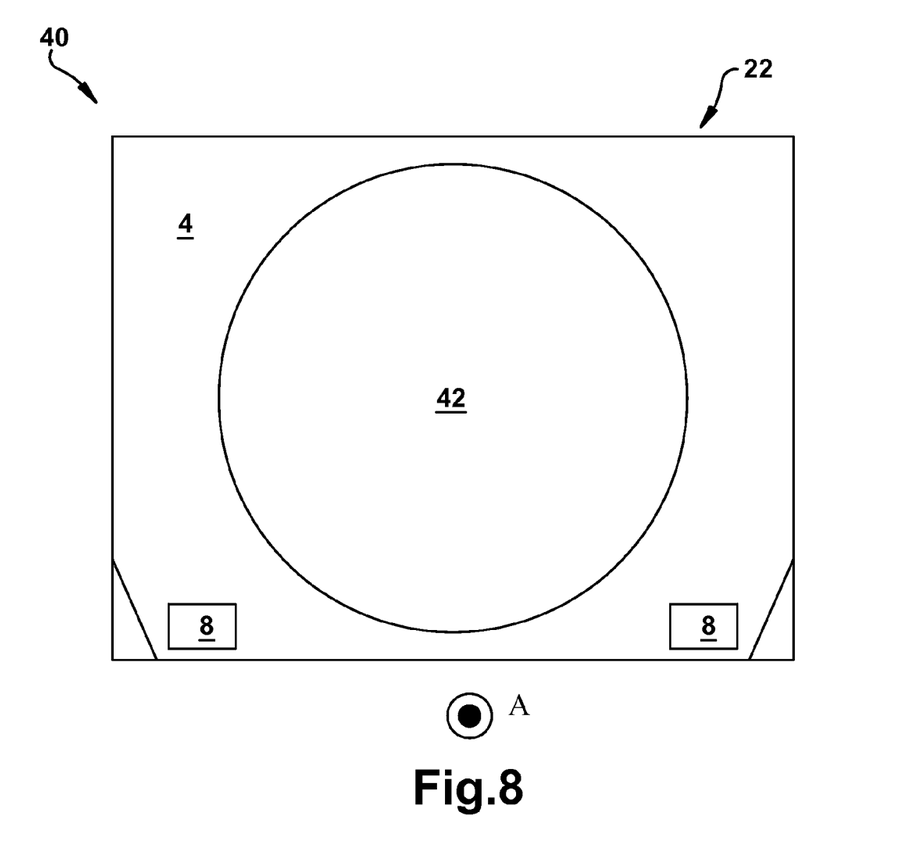
FIG. 8 shows an end view of a system according to various embodiments of the invention.

FIG. 8 shows a schematic end view of a system 40 including a support system (e.g., support system 2) and a dynamoelectric machine 42. In some cases, the support system 2 supports (and at least partially houses) the dynamoelectric machine 42 during operation of the dynamoelectric machine 42. The support system 2 includes one or more adjustment mechanism(s) 8 as described herein for adjusting the stiffness of the support system 2 (e.g., the skeletal frame 6) to help modify a natural frequency of the support system 2. By modifying the natural frequency of the support system 2, the system 40 can improve the performance of the dynamoelectric machine 42 and housing 4, e.g., by reducing unwanted resonance and/or vibration effects.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A support system for a dynamoelectric machine, the support system comprising:
    a housing;
    a skeletal frame attached to the housing and at least partially contained within the housing; and
    at least one adjustment mechanism for applying a force to the skeletal frame to modify a stiffness of the skeletal frame,
    wherein the housing includes a slot sized to complement the at least one adjustment mechanism.

2. The support system of claim 1, wherein the at least one adjustment system is located proximate a corner of the housing.

3. The support system of claim 1, wherein the at least one adjustment system includes four adjustment systems, wherein each of the four adjustment systems is located proximate a corner of the housing.

4. The support system of claim 1, wherein the at least one adjustment mechanism includes a slot and a wedge for applying the force to the skeletal frame.

5. The support system of claim 1, wherein the at least one adjustment system is accessible from a location external to the housing.

6. The support system of claim 1, wherein the at least one adjustment system includes at least one of a mechanical adjustment system, an electromechanical system, a pneumatic adjustment mechanism or a hydraulic adjustment mechanism.

7. The support system of claim 1, wherein the at least one adjustment system is at least one of manually or automatically actuatable.

8. A system comprising:
    a dynamoelectric machine;
    a support system supporting the dynamoelectric machine, the support system including:
        a housing;
        a skeletal frame attached to the housing and at least partially contained within the housing; and
        at least one adjustment mechanism for applying a force to the skeletal frame to modify a stiffness of the skeletal frame,
        wherein the at least one adjustment system is located proximate a corner of the housing.

9. The system of claim 8, wherein the housing includes a slot sized to complement the at least one adjustment mechanism.

10. The system of claim 8, wherein the at least one adjustment system includes four adjustment systems, wherein each of the four adjustment systems is located proximate a corner of the housing.

11. The system of claim 8, wherein the at least one adjustment mechanism includes a slot and a wedge for applying the force to the skeletal frame.

12. The system of claim 8, wherein the at least one adjustment system is accessible from a location external to the housing.

13. The system of claim 8, wherein the at least one adjustment system includes at least one of a mechanical adjustment system, an electromechanical system, a pneumatic adjustment mechanism or a hydraulic adjustment mechanism.

14. The system of claim 8, wherein the at least one adjustment system is at least one of manually or automatically actuatable.

15. A support system for a dynamoelectric machine, the support system comprising:
    a housing;
    a skeletal frame attached to the housing and at least partially contained within the housing;
    an adjustment mechanism at least partially housed within an axially facing surface of the housing, the adjustment system for applying a force to the skeletal frame to modify a stiffness of the skeletal frame,
    wherein the adjustment mechanism is accessible from a location external to the housing.

16. The support system of claim 15, wherein the housing includes a slot sized to complement the adjustment mechanism.

17. The support system of claim 15, wherein the at least one adjustment system is located proximate a corner of the housing.

* * * * *